G. T. BUDDLE.
FISH LURE.
APPLICATION FILED JUNE 22, 1921.

1,418,229.

Patented May 30, 1922.

G. T. Buddle,
Inventor.

By C. A. Snow & Co.
Attorney

UNITED STATES PATENT OFFICE.

GEORGE T. BUDDLE, OF CHICAGO, ILLINOIS.

FISH LURE.

1,418,229.  Specification of Letters Patent.  Patented May 30, 1922.

Application filed June 22, 1921. Serial No. 479,606.

*To all whom it may concern:*

Be it known that I, GEORGE T. BUDDLE, a citizen of the United States, residing at Chicago, in the county of Cook and State of Illinois, have invented a new and useful Fish Lure, of which the following is a specification.

This invention relates to devices known as fish lures or artificial bait, it being the primary object of the invention to provide a lure having novel means to removably secure colored yarn or the like thereto, to attract or lure the fish.

A further object of the invention is to provide means whereby the line may be attached to the lure to vary the course of the lure through the water.

A still further object of the invention is to provide a shoulder at the forward portion of the lure so that the water of the stream in which the lure is thrown will contact with the shoulder to release the lure when the line to which the lure is attached, is slackened.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1:
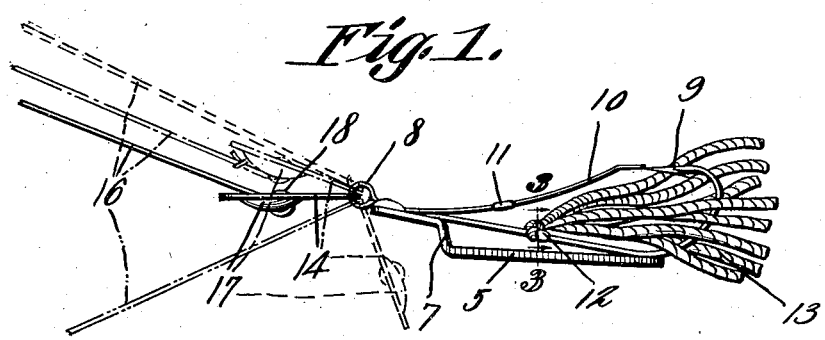
Figure 1 is a side elevational view of a lure constructed in accordance with the present invention, the same disclosing various manners of securing a line thereto.
Figure 2:
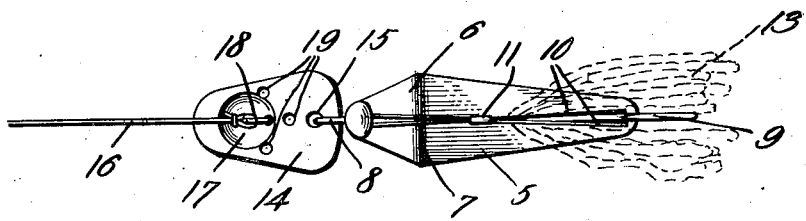
Figure 2 is a plan view of the same.
Figure 3:
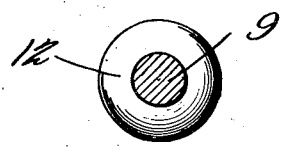
Figure 3 is a sectional view taken on line 3—3 of Figure 1.

Referring to the drawing in detail, the lure includes a body portion 5 which is relatively wide at its forward portion as indicated by the reference character 6, the extreme rear end of the body portion tapering from the relatively wide portion 6.

At the widest portion of the body 5 is a right angled portion 7 forming a shoulder so that when the lure is dropped into the current of a stream, the water of the stream will contact with the shoulder to retrieve the lure.

The hook, which forms a part of the lure is secured to the body portion in parallel relation therewith, and at a point intermediate the side edges thereof, the forward portion of the hook being formed into an eye 8, while the rear portion thereof constitutes the hook portion 9, there being provided a spring guard 10 cooperating with the hook portion to eliminate any possibility of a fish becoming released from the hook, once he has been caught by the same.

This guard is in the form of a pair of spring arms, the arms lying on opposite sides of the hook portion 9, the central portions thereof being secured by soldering the same together as indicated by the reference character 11.

Intermediate the ends of the hook member is formed a shoulder 12 which provides a stop to prevent the colored yarn or similar material which is secured to the hook portion from moving to a point adjacent to the hook portion of the hook, as clearly illustrated by Figure 1 of the drawing, the yarn which is indicated by the reference character 13 being shown as secured to the hook adjacent to the shoulder 12 as by tying the yarn.

A plate indicated at 14 has connection with the lure as through the eye 8, and opening 15 so that the line indicated at 16 which has connection with the plate 14 may move the plate 14 to various angles to the end that the lure is directed or guided through the water to meet the requirements of the user.

The plate 14 is provided with a depressed portion 17, which has a pair of openings to accommodate the ring 18, which ring provides means for attaching the line 16 to the plate 14 and it will be obvious that when the line 16 is connected to the ring 18 on the upper side of the plate 14, the plate 14 is tilted upwardly if the line is being wound on its reel, to the end that the lure is moved through the water adjacent to the surface thereof.

If the line 16 is secured directly to the eye 8, the lure will be moved through the water to the surface thereof. Openings 19 are also formed in the plate 14 and it is obvious that if the line 16 is secured to the plate 14 through the openings 19, the lure will be directed laterally through the water. Assuming that the line is secured to the plate 14 by connecting the same to the portion of the ring 18 which extends below the plate 14, it will be seen that the upper portion of the lure will be held out of the water, when the line is being wound on its reel.

What is claimed as new is:—

1. A fishing lure including a body portion having a shoulder formed intermediate its ends, a hook secured to the body portion and having an eye formed at one end thereof, a shoulder formed on the hook, a fish attracting means secured to the hook adjacent to the shoulder thereof, and means for securing a fish line to the lure to cause the lure to move through a stream at various angles.

2. A fishing lure including a body portion having a shoulder formed intermediate its ends, a plate having pivotal connection with the lure, said plate adapted to guide the lure through the water, and means carried by the plate for securing the line thereto.

3. A fishing lure including a body portion having a shoulder formed intermediate its ends, a hook member secured to the body portion and means for securing, and means for connecting a line to the lure to cause the same to take various angles through the water.

In testimony that I claim the foregoing as my own, I have hereto affixed my signature in the presence of two witnesses.

GEORGE T. BUDDLE.

Witnesses:
BERTHA NEUCHRANZ,
CHARLES JARCHOW.